United States Patent
Ohm et al.

(10) Patent No.: US 9,386,499 B2
(45) Date of Patent: Jul. 5, 2016

(54) METHOD FOR COMMUNICATING IN A WIRELESS COMMUNICATION NETWORK

(75) Inventors: Michael Ohm, Stuttgart (DE); Michael Schmidt, Stuttgart (DE); Thorsten Wild, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 938 days.

(21) Appl. No.: 13/578,869

(22) PCT Filed: Jan. 25, 2011

(86) PCT No.: PCT/EP2011/050988
§ 371 (c)(1),
(2), (4) Date: Aug. 14, 2012

(87) PCT Pub. No.: WO2011/098346
PCT Pub. Date: Aug. 18, 2011

(65) Prior Publication Data
US 2012/0315915 A1  Dec. 13, 2012

(30) Foreign Application Priority Data
Feb. 15, 2010  (EP) .................................... 10290072

(51) Int. Cl.
*H04W 36/00* (2009.01)
*H04W 36/32* (2009.01)
*H04W 36/08* (2009.01)

(52) U.S. Cl.
CPC .............. *H04W 36/32* (2013.01); *H04W 36/08* (2013.01)

(58) Field of Classification Search
CPC . H04W 36/32; H04W 36/0083; H04W 36/30; H04W 56/0035; H04W 84/005; H04W 56/0045; H04W 88/08; H04B 7/01; H04B 7/2675; H04B 2201/70702; H04B 7/18541; G01S 19/29; G01S 2205/008

USPC .................................................. 455/436–444
See application file for complete search history.

(56) References Cited

U.S. PATENT DOCUMENTS

| 5,551,059 A | 8/1996 | Hutcheson et al. |
| 2006/0239238 A1* | 10/2006 | Fernandez-Corbaton H04B 7/01 370/342 |
| 2007/0030927 A1* | 2/2007 | Jard ...................... H04B 7/2675 375/340 |

FOREIGN PATENT DOCUMENTS

WO  WO 2009/058069 A1  5/2009

OTHER PUBLICATIONS

Konstantinos Dimou et al., "Handover with 3GPP LTE: Design Principles and Performance," XP002588902, pp. 1-5, Sep. 23, 2009.
International Search Report for PCT/EP2011/050988 dated Mar. 23, 2011.

* cited by examiner

*Primary Examiner* — Olumide T Ajibade Akonai
(74) *Attorney, Agent, or Firm* — Fay Sharpe, LLP (57) ABSTRACT

The invention provides a method for communicating in a wireless communication network (206), the wireless communication network comprising a plurality of base stations (102; 104) and at least one mobile communication unit (100), the mobile communication unit comprising a transceiver component (300), a first Doppler compensation component (108), and a measurement component (110), wherein the first Doppler compensation component is adapted to compensate the Doppler shift of signals (1; 2; 7; 11; 12; 13) being exchanged between a base station of the plurality of base stations and the transceiver component. A handover procedure between two base stations is possible for fast moving user equipments.

9 Claims, 4 Drawing Sheets

METHOD FOR COMMUNICATING IN A WIRELESS COMMUNICATION NETWORK

FIELD OF THE INVENTION

The invention relates to a method for communicating in a wireless communication network, more specifically to a method for communicating in a wireless communication network with a fast moving user equipment.

BACKGROUND AND RELATED ART

In current standards for mobile telecommunication, especially 3GPP long term evolution (LTE), wireless communication is possible up to a speed of the user equipment of about 350 km per hour.

Especially the handover mechanism does not work properly for user equipments being moved faster than 350 km per hour, for example in a plane or a train. According to the LTE standard, handovers for user equipments with such a high movement speed can only be performed from one cell of a base station to another cell served by the same base station. A handover from a first cell served by a first base station to a second cell served by a second base station is not possible for user equipments with such high movement speeds.

K. Dimou et al. investigate in "Handover within 3GPP LTE: Design Principles and Performance" (2009-09-23) the performance of the handover procedure within 3GPP LTE in terms of HO failure rate and the delay of the whole procedure. System level simulations within a typical urban propagation environment, with different User Equipment (UE) speeds, cell radii and traffic loads per cell are disclosed.

SUMMARY OF THE INVENTION

It is the object of the present invention to provide an improved method for communicating in a wireless communication network. This object is achieved by a method according to independent claim 1. Embodiments of the invention are given in the dependent claims.

The invention provides a method for communicating in a wireless communication network, the wireless communication network comprising a plurality of base stations and at least one mobile communication unit. The mobile communication unit may for example be an onboard unit in a plane or a train. The mobile communication unit is adapted to communicate with the plurality of base stations. The mobile communication unit may further be adapted for communicating with user equipments. User equipments may for example be mobile phones, portable computers, PDAs or any other mobile communication device.

The mobile communication unit comprises a transceiver component, a first Doppler compensation component and a measurement component. The first Doppler compensation component is adapted to compensate the Doppler shift of signals being exchanged between a base station of the plurality of base stations and the transceiver component.

In a first step data is exchanged between the transceiver component and a first base station of the plurality of base stations. In case of a handover this first base station may also be referred to as the source base station. The first Doppler compensation component compensates the Doppler shift of signals carrying the data by using a first Doppler compensation value. The Doppler compensation is necessary because of the movement speed of the mobile communication unit. The Doppler shift depends on the speed of the mobile communication unit and the direction of the signals carrying the data.

In a second step a measurement is initiated by transmitting a first signal from the transceiver component to the measurement component.

In response to the first signal the measurement component transmits a second signal to the transceiver component. The second signal is indicative of measurement values being related to at least one second base station of the plurality of base stations. In case of a handover procedure, one of the at least one second base station may also be referred to as the target base station.

Then, a measurement report is transmitted from the transceiver component to the first base station. The measurement report comprises the measurement values of the measurement performed by the measurement component.

Subsequently, the first base station determines if a handover procedure to a target base station of the at least one second base station is initiated by the first base station. This step is performed analogue to a handover determination according to the LTE standard. Therefore the measurement report transmitted from the transceiver component to the first base station complies with the LTE standard.

If the first base station has determined to perform the handover procedure to the target base station, a third signal is transmitted from the first base station to the transceiver component. The third signal is indicative of initiating the handover procedure. This step is also performed according to LTE standards. It is to be noted that every step performed by the first or the at least one second base station complies with the LTE standard. Thus, a base station being adapted for performing a handover procedure according to the LTE standard is automatically also adapted for performing a handover procedure according to the present invention.

After having received the third signal the transceiver component transmits a fourth signal to the measurement component. The fourth signal is indicative of the target base station. It is to be noted that this and the following two method steps are only performed if the first base station has determined to perform the handover procedure to the target base station. Hence, by having received the fourth signal the measurement component knows about the initiated handover procedure from the source base station to the target base station.

The measurement component then transmits a fifth signal to the first Doppler compensation component. The fifth signal is indicative of changing the first Doppler compensation value to a second Doppler compensation value. The second Doppler compensation value is adapted to compensate the Doppler shift of signals being exchanged between the transceiver component and the target base station. In case of a fast moving mobile communication unit with a speed above 350 km per hour, the second Doppler compensation value differs significantly from the first Doppler compensation value.

As a last step in this embodiment of the invention a handover procedure is performed from the source base station to the target base station if the first base station has determined to perform the handover procedure.

According to embodiments of the invention the measurement component calculates the measurement values of the measurement report based on location data of the mobile communication unit, the movement direction and speed of the mobile communication unit, location data of the plurality of base stations and/or the radiation direction of antennas of the plurality of base stations. This means, that the measurement component does not really measure signal strength and/or signal quality of signals being exchanged between the mobile communication unit and the plurality of base stations. In fact, in these embodiments the measurement component estimates the signal strength and/or signal power of signals, which would be exchanged between the mobile communication unit and the plurality of base stations. Such a measurement may also be called fake measurement because the measurement values are not really measured but only estimated. In this case no signals are exchanged between the at least one second base station and the mobile communication unit.

The location data may for example be obtained by a satellite navigation system, such as GPS. In a plane normally a satellite navigation system is already present and only needs to be connected to a mobile communication unit according to embodiments of the present invention for providing location data to the mobile communication unit.

This is advantageous because no real measurement of signals being exchanged between the mobile communication unit and the plurality of base stations is necessary for determining if a handover procedure shall be performed. Another advantage is that the measurement report transmitted from the transceiver component to the first base station complies with the LTE standard such that the first base station does not know that there was no real measurement performed. As no communication between the mobile communication unit and the at least one second base station of the plurality of base stations is necessary, there is also no necessity for compensating the Doppler shift of signals being exchanged between the transceiver component and the at least one second base station. Thus, by using the fake measurements of the measurement component a handover can be performed from a source base station to a target base station for mobile communication units having a movement speed above 350 km per hour.

A real measurement of the signal quality and signal strength exchanged between the transceiver component and the at least one second base station is impossible in the LTE standard for mobile communication units with a speed above 350 km per hour due to the big difference in the Doppler shift compensation values. Embodiments of the invention are especially advantageous for mobile communication units being moved with a speed between 800 and 1200 km per hour. In this speed range the Doppler shift compensation value may for example be for the source base station minus 2 kHz and for the target base station plus 2 kHz, when the mobile communication unit is moved directly from the source base station to the target base station. Hence, embodiments of the invention are especially advantageous in direct air-to-ground (DA2G) systems, where a mobile communication unit in a plane is served by a base station on the ground, wherein the base station on the ground is a common base station of a mobile communication network complying with the LTE standard.

Common mobile communication units are not able to perform measurements for signals being exchanged between the transceiver component and the at least one second base station because an estimation of the Doppler shift compensation value cannot be performed based on pilot symbols of the signals.

According to embodiments of the invention the measurement component calculates the measurement values based on an expected timing advance and/or on expected path losses of signals being exchanged between the transceiver component and the at least one second base station and/or on expected signal-to-noise ratio of signals being exchanged between the transceiver component and the at least one second base station or based on a combination thereof. This means that the measurement values of the measurement report are calculated based on the location data of the mobile communication unit and of the plurality of base stations, the movement direction and speed of the mobile communication unit by calculating for example the expected path losses with the free space propagation path loss (FSPL) formula:

$$FSPL(dB) = 20 \log_{10}(d) + 20 \log_{10}(f) + 32.45,$$

wherein d is the distance measured in km and f is the frequency measured in MHz

According to embodiments of the invention the measurement component comprises a receiver component and a second Doppler compensation component. The receiver component receives at least one signal from the at least one second base station. The measurement component measures signal strength and signal quality of the at least one signal from the at least one second base station. The measurement report comprises the signal strength and the signal quality of the at least one signal.

This means that the measurement component really measures signal strength and signal quality of the at least one signal. Therefore, a second Doppler compensation component is necessary for compensating the Doppler shift of signals being transmitted between the transceiver component and the at least one second base station. The second Doppler compensation component is necessary because the first Doppler compensation component cannot compensate the Doppler shift of signals being received from the first base station while compensating the Doppler shift of signals being received from the at least one second base station due to the big difference in the Doppler shifts.

In another aspect the invention relates to a mobile communication unit comprising a transceiver component, a first Doppler compensation component, and a measurement component. The Doppler compensation component is adapted to compensate the Doppler shift of signals being received from a base station by using a first Doppler compensation value. The measurement component comprises first signal receiving means for receiving signals from the transceiver component. The transceiver component comprises second signal receiving means for receiving signals from the measurement component and the Doppler compensation component comprises third signal receiving means for receiving signals from the measurement component. The transceiver component further comprises data transmission means and data receiving means for exchanging data between the transceiver component and a source base station. The transceiver component further comprises first signal transmission means for initiating a measurement by transmitting a first signal from the transceiver component to the measurement component. The measurement component comprises second signal transmission means for transmitting a second signal from the measurement component to the transceiver component. The second signal is indicative of the measurement values being related to at least one second base station. The transceiver component comprises measurement report transmission means for transmitting a measurement report from the transceiver component to the source base station. The measurement report comprises the measurement values. The transceiver component further comprises third signal transmission means for transmitting a fourth signal from the transceiver component to the measurement component. The fourth signal is indicative of a target base station. The measurement component further comprises fourth signal transmission means for transmitting a fifth signal from the measurement component to the first Doppler compensation component. The fifth signal is indicative of changing the first Doppler compensation value to a second Doppler compensation value. The second Doppler compensation value is adapted to compensate the Doppler shift of signals being exchanged between the transceiver component and a target base station. Thus, such a mobile communication unit is adapted to perform a method according to embodiments of the invention.

According to embodiments of the invention the mobile communication unit further comprises a data storage. A database is stored in the data storage. The database comprises location data of the plurality of base stations and/or a plurality of radiation directions of antennas of the plurality of base stations. The measurement component comprises location data receiving means for receiving location data from a location system. The mobile communication unit further comprises first calculation means for calculating the measurement values of the measurement report based on the location data and the location data of the plurality of base stations, and/or the plurality of radiation directions of the antennas of the plurality of base stations.

From the database in the data storage the measurement component may read the location data of the plurality of base stations and/or a plurality of radiation directions of antennas of the plurality of base stations. A location system is already present in common planes such that the location data receiving means may receive location data from this location system. The first calculation means then calculate the measurement values for the fake measurement report using the data stored in the database and the location data.

According to embodiments of the invention the measurement component further comprises a receiver component and a second Doppler compensation component. The second Doppler compensation component is adapted for compensating the Doppler shift of signals being received by the receiver component. The receiver component comprises fifth signal receiving means for receiving at least one signal from at least one second base station. The measurement component comprises measurement means for measuring signal strength and signal quality of the at least one signal from the at least one second base station. The measurement report comprises the signal strength and the signal quality of the at least one second signal.

In another aspect the invention relates to a mobile communication system comprising a mobile communication unit according to the embodiments of the invention and a plurality of base stations.

In yet another aspect the invention relates to a computer readable storage medium containing instructions that when executed by a mobile communication unit cause the mobile communication unit to perform a method for communicating with a plurality of base stations of a wireless communication network.

The method comprises exchanging data between the transceiver component and a source base station of the plurality of base stations. The first Doppler compensation component of the mobile communication unit compensates the Doppler shift of signals carrying the data by using a first Doppler compensation value. A measurement is initiated by transmitting a first signal from the transceiver component to the measurement component. A second signal is transmitted from the measurement component to the transceiver component. The second signal is indicative of measurement values being related to at least one second base station of the plurality of base stations. A measurement report is transmitted from the transceiver component to the source base station. The measurement report comprises the measurement values. A third signal is received from the source base station by the transceiver component. The third signal is indicative of initiating a handover procedure to a target base station. Afterwards, a fourth signal is transmitted from the transceiver component to the measurement component. The fourth signal is indicative of the target base station. Subsequently, a fifth signal is transmitted from the measurement component to the first Doppler compensation component. The fifth signal is indicative of changing the first Doppler compensation value to a second Doppler compensation value. The second Doppler compensation value is adapted to compensate the Doppler shift signals being exchanged between the transceiver component and the target base station. Finally, a handover procedure from the source base station to the target base station is performed.

BRIEF DESCRIPTION OF THE DRAWINGS

In the following preferred embodiments of the invention will be described, by way of example only, and with reference to the drawings in which.

DETAILED DESCRIPTION

Like numbered elements in these Figs. are either identical elements or perform the same function. Elements which have been discussed previously will not necessarily be discussed in later FIGS. if the function is identical.

Figure 1:
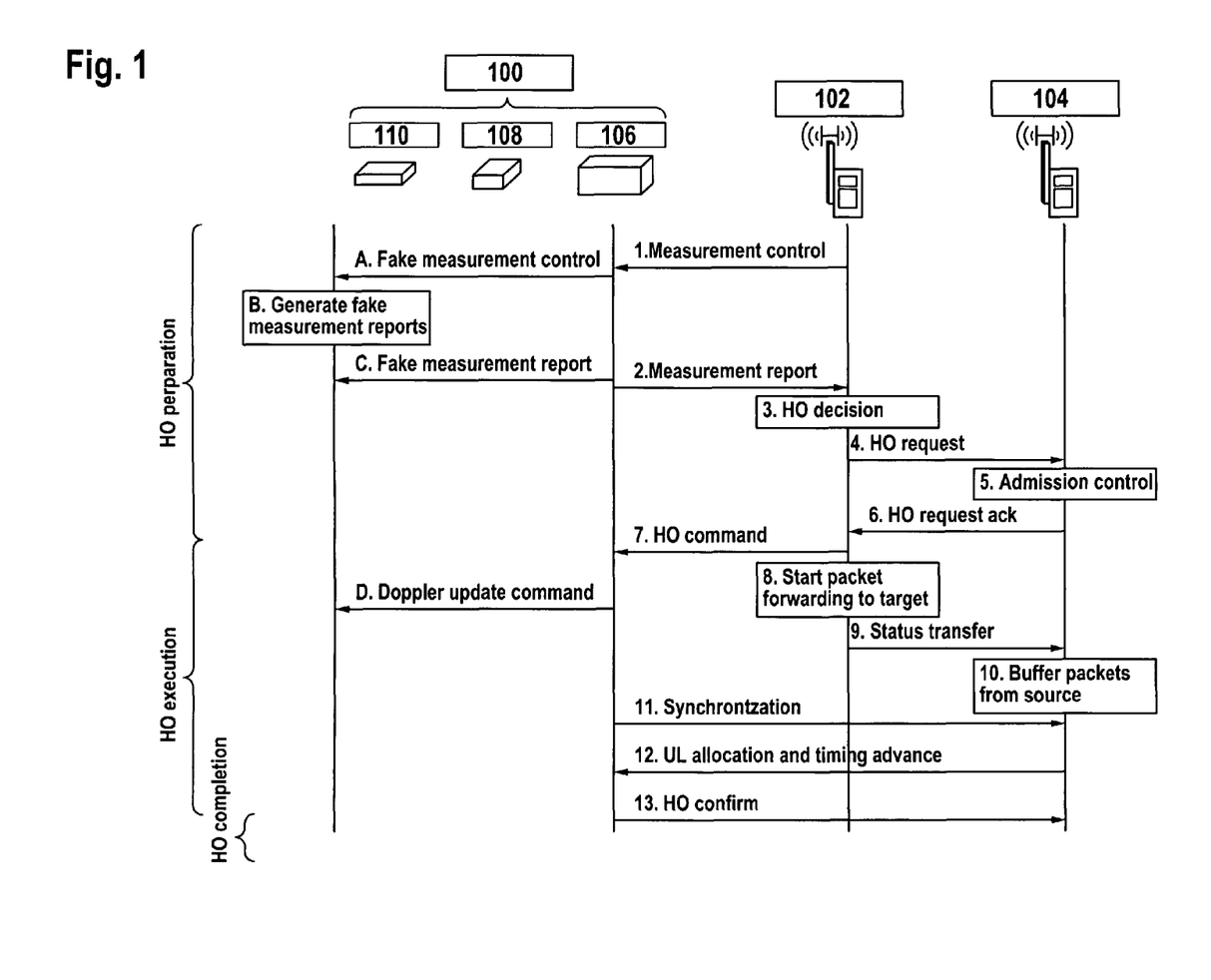
FIG. 1 shows schematically the handover procedure from a source base station to a target base station.

FIG. 1 is a schematic view of a handover procedure performed by a mobile communication unit 100 according to embodiments of the invention from a source base station 102 to a target base station 104. The mobile communication unit 100 comprises a standard LTE complying part 106, a Doppler compensation component 108 and a measurement component 110. In a first step the source base station 102 transmits a measurement control signal to the LTE complying part 106 in the mobile communication unit 100 as it is defined in the LTE standard. Then, the LTE complying part 106 transmits a fake measurement control signal A to the measurement component 110. The fake measurement control signal A causes the measurement component 110 to generate a fake measurement report in step B. Subsequently, a fake measurement report C is transmitted to the LTE complying part 106 from the measurement component 110. The LTE complying part 106 then transmits a measurement report based on the fake measurement report to the source base station 102. It is to be noted that the communication between the source base station 102, the target base station 104 and the LTE complying part 106 of the mobile communication unit 100 complies with the LTE standard such that the base stations 102 and 104 are not subject of changes with respect to common base stations in common LTE networks.

In step 3 the source base station 102 decides if a handover procedure shall be performed. If a handover procedure shall be performed base station 102 transmits a handover request 4 to target base station 104. Target base station 104 then performs an admission control 5 and transmits a handover request acknowledgement signal 6 to source base station 102. Afterwards, a handover command 7 is transmitted to the LTE complying part 106 of the mobile communication unit 100. The LTE complying part 106 of the mobile communication unit 100 then transmits a Doppler update command D to measurement component 110, which then causes the Doppler compensation component 108 to shift the Doppler compensation value from a first value to a second value. The second value is adapted for a communication between the mobile communication unit 100 and the target base station 104.

By having changed the Doppler compensation value to the second Doppler compensation value the LTE complying part 106 is able to communicate with target base station 104. In parallel to the Doppler update process in the mobile communication unit 100 the source base station 102 has started packet forwarding to target base station 104 in step 8 and has transferred the status of the mobile communication unit 100 in step 9 to the target base station 104. The target base station 104 has buffered packets from the source base station 102 in step 10 and then synchronizes with the mobile communication unit 100 in step 11. It is to be noted that the communication between the source base station and the target base station complies with the LTE standard as well as the communication between the target base station 104 and the LTE complying part 106 of the mobile communication 100. Afterwards, in steps 12 and 13 the timing advance is transmitted to the LTE complying part 106 of the mobile communication unit 100 in step 12 as well as uplink is allocated. In step 13 the handover is confirmed by the LTE complying part 106 of the mobile communication unit 100. The handover is completed without interaction with the mobile communication unit 100 between the source base station 102 and the target base station 104 according to the LTE standard.

Figure 2:
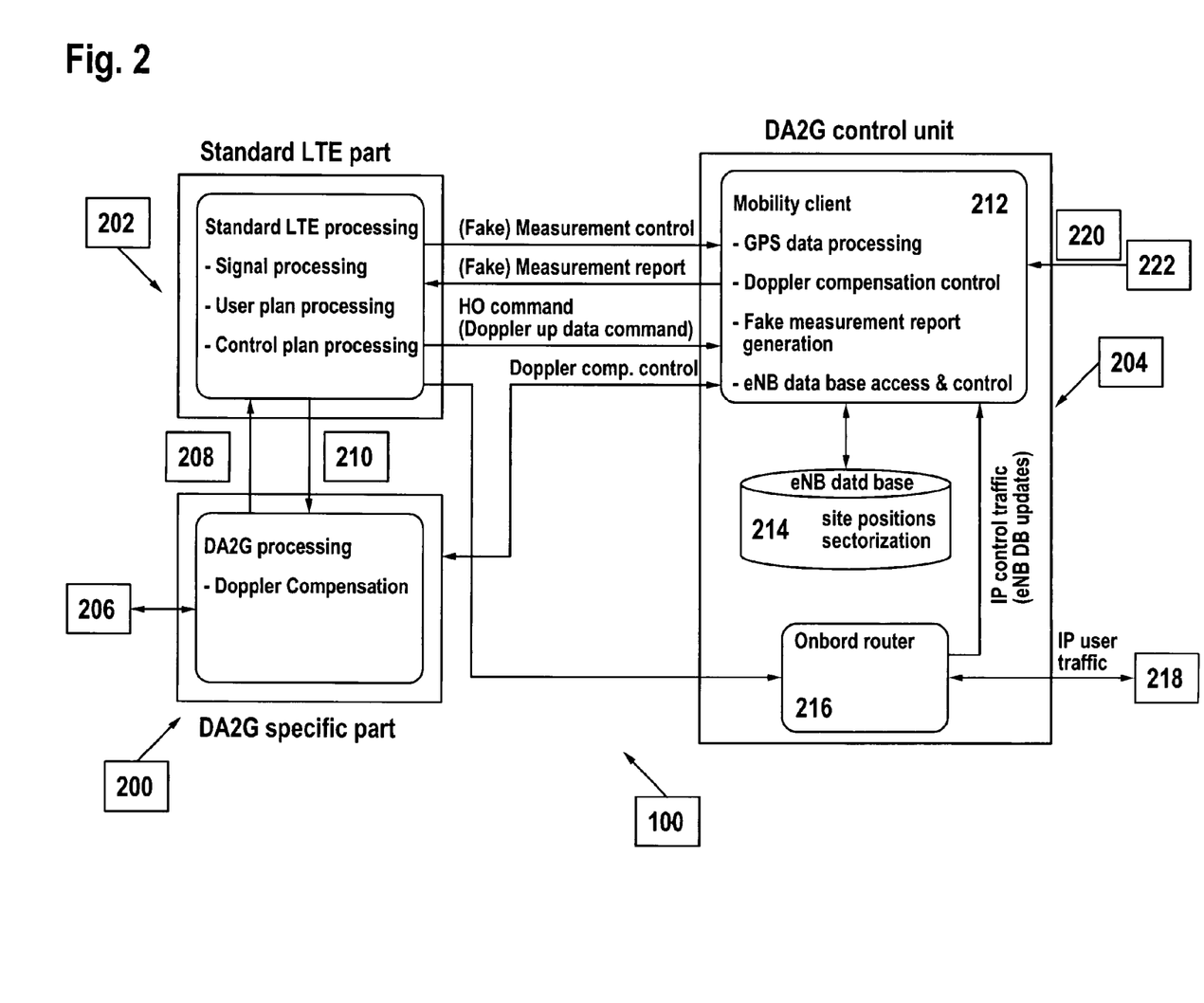
FIG. 2 is a schematic view of a mobile communication unit.

FIG. 2 is a schematic view of a mobile communication unit 100. The mobile communication unit 100 may for example be located in a plane for direct air-to-ground communication (DA2G). The mobile communication unit 100 comprises a standard LTE part 200, a DA2G specific part 202, and a DA2G control unit 204. The standard LTE part 202 performs standard LTE processing steps such as signal processing, user plan processing and control plan processing.

The DA2G control unit 204 comprises a mobility client 212, an EnB database 214 and an onboard router 216. The onboard router is adapted for receiving IP user and control traffic signals from the standard LTE part 202. The onboard router 216 forwards IP user traffic received from the standard LTE part 202 to users 218 connected to the mobile communication unit 100. IP control traffic signals received from the standard LTE part 202 are forwarded by the onboard router 216 to the mobility client 212. IP control traffic signals may for example comprise updates for the database 214.

The mobility client 212 is adapted for receiving location data 220 from a location system 222. The mobility client 212 may also be referred to as the measurement component.

The DA2G specific part 200 performs the Doppler compensation for signals being received from the mobile communication network 206 and for signals being transmitted to the mobile communication network 206. Every communication between the mobile communication network 206 and the mobile communication unit 100 has to pass the DA2G specific part 200 for Doppler compensation. This applies for the forward link signal 208 and for the reverse link signal 210, wherein the forward link signal 208 is directed from the mobile communication network 206 to the mobile communication unit 100, more specifically to the standard LTE part 202 of the mobile communication unit 100. The reverse link signal 210 is directed from the mobile communication unit 100 to the mobile communication network 206, more specifically from the standard LTE part 202 of the mobile communication unit 100. A communication of a fast moving plane for example with such a mobile communication unit 100 is only possible because of the Doppler compensation performed in the DA2G specific part 200.

The mobile communication network 206 may request a measurement report from the mobile communication unit 100 by transmitting a measurement control signal to the mobile communication unit 100. The measurement control signal may be indicative of a single requested measurement report or a periodic transmission of measurement reports. The received measurement control signal is forwarded by the DA2G specific part 200 to the standard LTE part 202 after Doppler shift compensation. The standard LTE part 202 then transmits a fake measurement control signal to the DA2G control unit 204.

After receiving the fake measurement control signal from the standard LTE part 202 the mobility client 212 performs a fake measurement based on data stored in database 214. In database 214 positions of base stations of the mobile communication network 206 are stored as well as antenna directions and/or cell sizes and cell sectorizations.

The mobility client 212 performs the fake measurement based on data about the base stations of the mobile communication network 206 stored in database 214 and on location data 220 received from location system 222. Thus, the mobility client knows the location and movement speed of the mobile communication unit 100 and the position and radiation direction of a plurality of base stations of mobile communication network 206. The mobility client 212 then calculates fake measurement values for each base station being located around mobile communication unit 100 by using for example the free path loss formula or a formula for calculating the timing advance.

After having calculated the fake measurement values the mobility client 212 transmits a fake measurement report to the standard LTE part 202 comprising the fake measurement values. The standard LTE part 202 forwards this fake measurement report as a common LTE complying measurement report to the DA2G specific part 200, which then forwards the measurement report to a base station of the mobile communication network 206.

When a handover command is received by the standard LTE part 202, the standard LTE part 202 forwards the handover command to the mobility client 212 of the DA2G control unit 204. Because the mobility client 212 knows about the location and movement speed of the mobile communication unit 100 and of the location of the target base station of the handover procedure, the mobility client 212 calculates a new Doppler compensation value, which is adapted for communication with the target base station of the handover command. The mobility client 212 then transmits this new Doppler compensation value to the DA2G specific part 200 with a Doppler compensation control signal. The DA2G specific part 200 then uses this new Doppler compensation value for communication with the target base station of the handover command.

Figure 3:
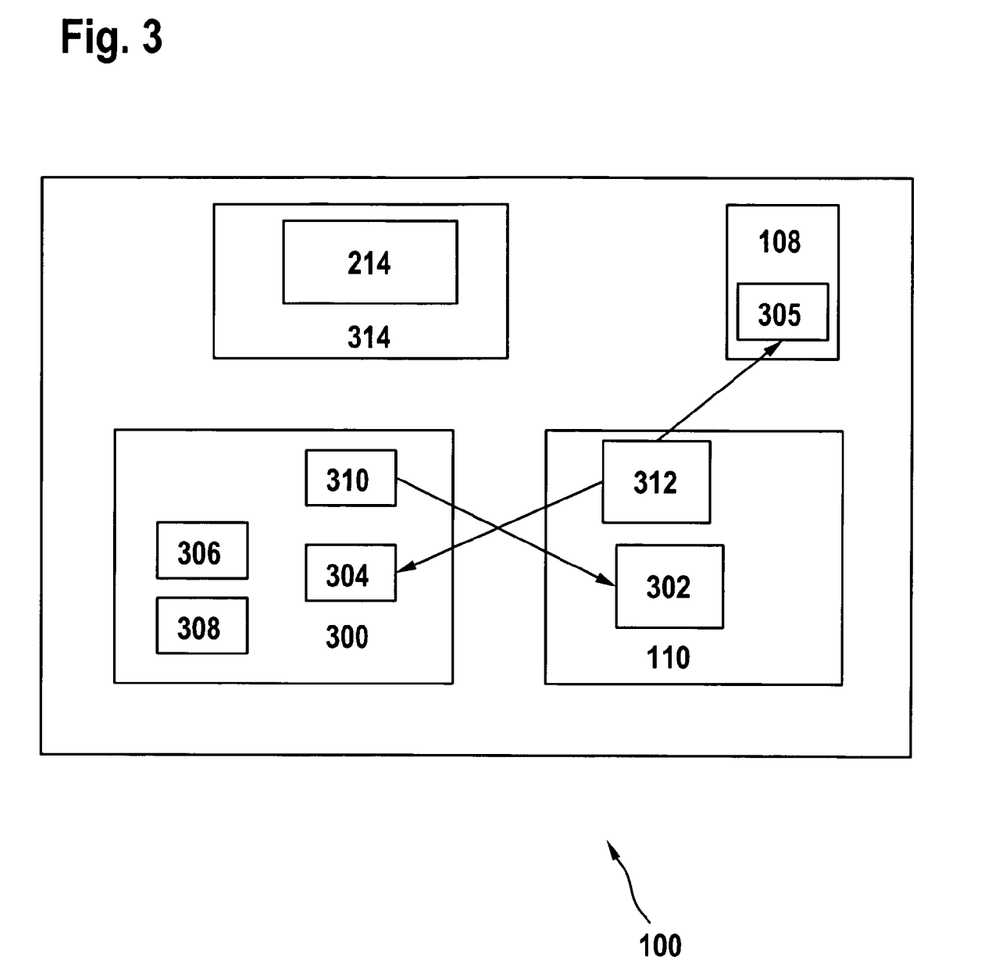
FIG. 3 is a block diagram of a mobile communication unit.

FIG. 3 is a block diagram of a mobile communication unit 100 comprising a transceiver component 300, a first Doppler compensation component 108 and a measurement component 110.

The first Doppler compensation component 108 is adapted for compensating the Doppler shift of signals being received from a base station by using a first Doppler compensation value. The measurement component 110 comprises first signal receiving means 302 for receiving signals from the transceiver component 300. The transceiver component 300 comprises second signal receiving means 304 for receiving signals from the measurement component 110. The Doppler compensation component 108 comprises third signal receiving means 305 for receiving signals from the measurement component 110.

The transceiver component 300 comprises data transmission means 306 and data receiving means 308 for exchanging data between the transceiver component and a source base station (not depicted). The transceiver component 300 further comprises first signal transmission means 310 for initiating a measurement by transmitting a first signal from the transceiver component to the measurement component. The measurement component 110 comprises second signal transmission means 312 for transmitting a second signal from the measurement component 110 to the transceiver component, wherein the second signal is indicative of the measurement values being related to at least one base station.

The mobile communication unit 100 further comprises a data storage 314 comprising the database 214.

Figure 4:
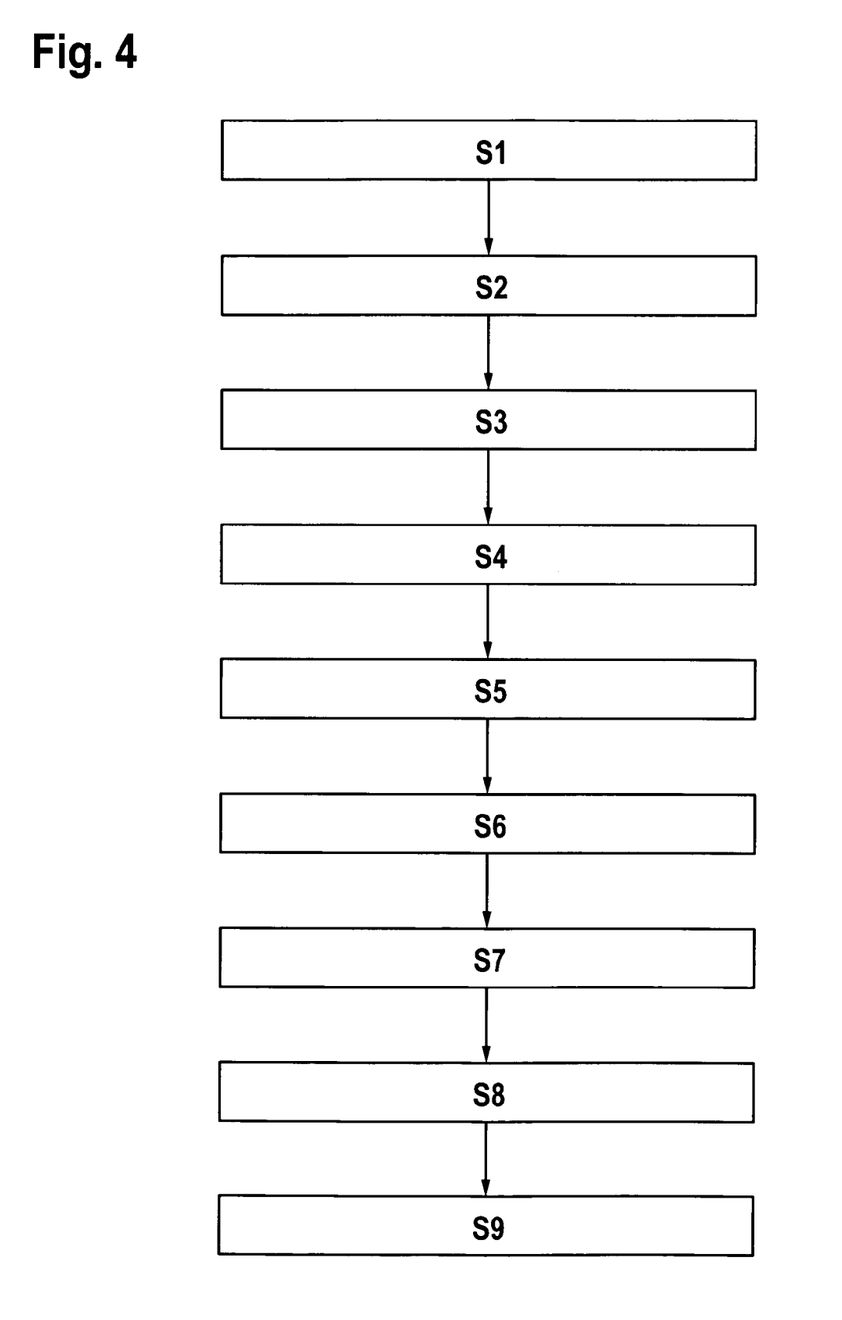
FIG. 4 is a flow diagram of a method for communicating in a wireless communication network.

FIG. 4 is a flow diagram of a method according to embodiments of the invention. The method comprising the following steps:

In step S1 data is exchanged between the transceiver component and a first base station of the plurality of base stations, wherein the first Doppler compensation component compensates the Doppler shift of signals carrying the data by using a first Doppler compensation value.

In step S2 a measurement is initiated by transmitting a first signal from the transceiver component 300 to the measurement component 110. In step S3 a second signal is transmitted from the measurement component 110 to the transceiver component 300, which is indicative of measurement values being related to the at least one second base station of the plurality of base stations.

In step S4 a measurement report is transmitted from the transceiver component 300 to the first base station, the measurement report comprising the measurement values of the measurement. In step S5 it is determined if a handover procedure from the first base station to a target base station of the at least one second base station is initiated by the first base station.

In step S6 a third signal is transmitted from the first base station to the transceiver component 300, which is indicative of initiating the handover procedure. In step S7 a fourth signal is transmitted from the transceiver component 300 to the measurement component 110, the fourth signal being indicative of the target base station.

In step S8 a fifth signal is transmitted from the measurement component 110 to the first Doppler compensation component 108, the fifth signal being indicative of changing the first Doppler compensation value to a second Doppler compensation value. Finally, in S9 a handover procedure is performed from the source base station to the target base station.

It is to be noted that steps S6-S9 are only performed if the source base station has determined to perform a handover procedure.

| List of reference numerals | |
|---|---|
| 100 | Mobile communication unit |
| 102 | Source base station |
| 104 | Target base station |
| 106 | LTE complying part |
| 108 | Doppler compensation component |
| 110 | Measurement component |
| 200 | LTE part |
| 202 | DA2G specific part |
| 204 | DA2G control unit |
| 206 | Mobile communication network |
| 208 | Forward link signal |
| 210 | Reverse link signal |
| 212 | Mobility client |
| 214 | Database |
| 216 | Onboard router |
| 218 | Users |

-continued

| List of reference numerals | |
|---|---|
| 220 | Location data |
| 222 | Location system |
| 300 | Transceiver component |
| 302 | Signal receiving means |
| 304 | Signal receiving means |
| 305 | Signal receiving means |
| 306 | Data transmission means |
| 308 | Data receiving means |
| 310 | Signal transmission means |
| 312 | Signal transmission means |
| 314 | Data storage |
| 1 | Measurement control signal |
| 2 | Measurement report signal |
| 3 | Handover decision |
| 4 | Handover request signal |
| 5 | Admission control |
| 6 | Handover request acknowledgement signal |
| 7 | Handover command signal |
| 8 | Start packet forwarding to target |
| 9 | Status transfer |
| 10 | Buffer packets from source |
| 11 | Synchronization |
| 12 | Upload allocation and timing advance |
| 13 | Handover confirm signal |
| A | Fake measurement control signal |
| B | General fake measurement report |
| C | Fake measurement report signal |
| D | Doppler update command signal |

The invention claimed is:

1. A method for communicating in a wireless communication network, the wireless communication network comprising a plurality of base stations and at least one mobile communication unit, wherein the mobile communication unit is moving at speeds above the limit that is allowable in LTE standard, the mobile communication unit comprising a transceiver component, a first Doppler compensation component, and a measurement component, wherein the first Doppler compensation component is adapted to compensate the Doppler shift of signals being exchanged between a base station of the plurality of base stations and the transceiver component, wherein the method comprises:

exchanging data between the transceiver component and a first base station of the plurality of base stations, wherein the first Doppler compensation component compensates the Doppler shift of signals carrying the data by using a first Doppler compensation value;

initiating a measurement by transmitting a first signal from the transceiver component to the measurement component;

transmitting a second signal from the measurement component to the transceiver component, the second signal being indicative of measurement values being related to at least one second base station of the plurality of base stations;

transmitting a measurement report from the transceiver component to the first base station, the measurement report comprising the measurement values of the measurement;

determining if a handover procedure from the first base station to a target base station of the at least one second base station is initiated by the first base station;

transmitting a third signal from the first base station to the transceiver component, if the first base station has determined to perform the handover procedure to the target base station, the third signal being indicative of initiating the handover procedure;

transmitting a fourth signal from the transceiver component to the measurement component, the fourth signal being indicative of the target base station, if the first base station has determined to perform the handover procedure to the target base station;

transmitting a fifth signal from the measurement component to the first Doppler compensation component, the fifth signal being indicative of changing the first Doppler compensation value to a second Doppler compensation value, the second Doppler compensation value being adapted to compensate the Doppler shift of signals being exchanged between the transceiver component and the target base station, if the first base station has determined to perform the handover procedure to the target base station; and performing a handover procedure if the first base station has determined to perform a handover procedure to the target base station.

2. Method according to claim 1, wherein the measurement component calculates the measurement values of the measurement report based on location data of the mobile communication unit, the movement direction and speed of the mobile communication unit, location data of the plurality of base stations, and/or the radiation direction of antennas of the plurality of base stations.

3. Method according to claim 2, wherein the measurement component calculates the measurement values based on an expected timing advance and/or on expected path losses of signals being exchanged between the transceiver component and the at least one second base station and/or on expected signal-to-noise ratio of signals being exchanged between the transceiver component and the at least one second base station or based on a combination thereof.

4. Method according to claim 1, wherein the measurement component comprises a receiver component and a second Doppler compensation component, the receiver component receiving at least one signal from the at least one second base station, wherein the measurement component measures signal strength and signal quality of the at least one signal from the at least one second base station, and wherein the measurement report comprises the signal strength and the signal quality of the at least one signal.

5. A mobile communication unit comprising a transceiver component, a first Doppler compensation component, and a measurement component, wherein the first Doppler compensation component is adapted to compensate the Doppler shift of signals being received from a base station by using a first Doppler compensation value, wherein the measurement component comprises first signal receiving means for receiving signals from the transceiver component, wherein the transceiver component comprises second signal receiving means for receiving signals from the measurement component, and wherein the Doppler compensation component comprises third signal receiving means for receiving signals from the measurement component, wherein the mobile communication unit is adapted for being moved at speeds above the limit that is allowable in LTE standard, the transceiver component comprising data transmission means and data receiving means for exchanging data between the transceiver component and a source base station;

the transceiver component further comprising first signal transmission means for initiating a measurement by transmitting a first signal from the transceiver component to the measurement component;

the measurement component comprising second signal transmission means for transmitting a second signal from the measurement component to the transceiver component, the second signal being indicative of measurement values being related to at least one second base station;

the transceiver component comprising measurement report transmission means for transmitting a measurement report from the transceiver component to the source base station, the measurement report comprising the measurement values;

the transceiver component further comprising third signal transmission means for transmitting a fourth signal from the transceiver component to the measurement component, the fourth signal being indicative of a target base station; and the measurement component comprising fourth signal transmission means for transmitting a fifth signal from the measurement component to the first Doppler compensation component, the fifth signal being indicative of changing the first Doppler compensation value to a second Doppler compensation value, the second Doppler compensation value being adapted to compensate the Doppler shift of signals being exchanged between the transceiver component and a target base station.

6. Mobile communication unit according to claim 5, wherein the mobile communication unit further comprises a data storage, a database being stored in the data storage, the database comprising location data of the plurality of base stations and/or a plurality of radiation directions of antennas of the plurality of base stations, wherein the measurement component comprises location data receiving means for receiving location data from a location system and first calculation means for calculating the measurement values of the measurement report based on the location data and the location data of the plurality of base stations, and/or the plurality of radiation directions of the antennas of the plurality of base stations.

7. Mobile communication unit according to claim 5, wherein the measurement component further comprises a receiver component and a second Doppler compensation component, the second Doppler compensation component is adapted for compensating the Doppler shift of signals being received by the receiver component, wherein the receiver component comprises fifth signal receiving means for receiving at least one signal from at least one second base station, wherein the measurement component comprises measurement means for measuring signal strength and signal quality of the at least one signal from the at least one second base station, and wherein the measurement report comprises the signal strength and the signal quality of the at least one second signal.

8. A mobile communication system comprising a mobile communication unit of claim 5 and a plurality of base stations.

9. A non-transitory computer-readable storage medium containing instructions that when executed by a mobile communication unit cause the mobile communication unit to perform a method for communicating with a plurality of base stations of a wireless communication network, wherein the mobile communication unit is adapted for being moved at speeds above the limit that is allowable in LTE standard, the method comprising:

exchanging data between the transceiver component and a source base station of the plurality of base stations, wherein the first Doppler compensation component compensates the Doppler shift of signals carrying the data by using a first Doppler compensation value;

initiating a measurement by transmitting a first signal from the transceiver component to the measurement component;

transmitting a second signal from the measurement component to the transceiver component, the second signal being indicative of measurement values being related to at least one second base station of the plurality of base stations;

transmitting a measurement report from the transceiver component to the source base station, the measurement report comprising the measurement values;

receiving a third signal from the source base station by the transceiver component, the third signal being indicative of initiating a handover procedure to a target base station;

transmitting a fourth signal from the transceiver component to the measurement component, the fourth signal being indicative of the target base station;

transmitting a fifth signal from the measurement component to the first Doppler compensation component, the fifth signal being indicative of changing the first Doppler compensation value to a second Doppler compensation value, the second Doppler compensation value being adapted to compensate the Doppler shift of signals being exchanged between the transceiver component and the target base station; and performing a handover procedure from the source base station to the target base station.

* * * * *